United States Patent

Schatzler et al.

[11] 3,894,767
[45] July 15, 1975

[54] PIVOTABLE AND RETRACTABLE SLIDING ROOF FOR AUTOMOBILES

[76] Inventors: Walter Schatzler, Angerweidestrasse 10a, 813 Starnberg; Alfons Lutz, Lohfeldstrasse 4, 8033 Krailling, both of Germany

[22] Filed: Sept. 14, 1973

[21] Appl. No.: 397,224

[30] Foreign Application Priority Data
Sept. 14, 1972 Germany............................ 2245084

[52] U.S. Cl. ............................... 296/137 F; 49/211
[51] Int. Cl. .............................................. B60j 7/02
[58] Field of Search ......... 296/137 B, 137 E, 137 F, 296/137 G, 137 H, 137 C, 137 D, 137 J, 137 R; 49/211, 209, 152, 360

[56] References Cited
UNITED STATES PATENTS
2,550,323   4/1951   Bishop ................................ 49/209

FOREIGN PATENTS OR APPLICATIONS
1,919,479   5/1968   Germany.......................... 296/137 J
1,933,991   7/1969   Germany.......................... 296/137 B

*Primary Examiner*—Robert J. Spar
*Assistant Examiner*—Donald W. Underwood
*Attorney, Agent, or Firm*—Joseph A. Geiger

[57] ABSTRACT

A sliding roof assembly for automobiles where the sliding roof panel is operable either by upward pivoting or by downward pivoting followed by retraction under the stationary roof portion, the motion being transmitted to the panel by a cross member over pivoting linkages, and where a rain channel is arranged under the rear edge of the opening and remains in place during the pivoting motions, but which is retracted in unison with the sliding roof panel when the latter is retracted.

12 Claims, 7 Drawing Figures

3,894,767

SHEET 1

PIVOTABLE AND RETRACTABLE SLIDING ROOF FOR AUTOMOBILES

BACKGROUND OF THE INVENTION

1. Field of the Invention

The present invention relates to sliding roofs for automobiles, and in particular to pivotable and retractable sliding roofs where the sliding roof panel can be either pivoted upwardly or downwardly relative to the stationary roof structure, and where, in the latter case, the panel is retractable under the roof structure, the raising and lowering of the sliding roof panel being accomplished by means of a pivoting linkage connected to a movable cross member of the sliding roof structure.

2. Description of the Prior Art

Automobile sliding roofs permitting two modes of opening, viz. upward pivoting of the rear portion of the sliding roof panel, or downward pivoting of its rear portion and retraction of the panel under the stationary roof portion, are known in various versions. However, these known prior art solutions are so arranged that the cross member of the movable roof structure also serves as a rain channel under the rear edge of the sliding roof panel. Since the pivoting mechanism consists of a linkage connecting the horizontally movable cross member with the upwardly and downwardly pivotable rear portion of the sliding roof panel, this prior art rain channel has to be rather large to allow for the horizontal motion necessary for the upward pivoting of the panel, without losing its function as a rain channel under the upwardly open roof panel. such a wide rain channel, moving forwardly as the roof panel is pivoted upwardly, tends to interfere with the rear edge of the canopy under the roof panel, thereby necessitating the use of a shortened canopy and inner roof opening.

This type of arrangement thus involves a compromise between the width of the rain channel and the length of the inner roof opening on the one hand, and the maximum angle of upward opening of the roof panel on the other hand, this compromise representing a disadvantage and shortcoming of the various prior art solutions.

SUMMARY OF THE INVENTION

It is a primary objective of the present invention to overcome the aforementioned shortcomings by suggesting a novel sliding roof structure in which the interdependency between the angle of upward pivoting of the sliding roof panel and the rain channel position is eliminated.

The invention proposes to attain the above objective by suggesting a rain channel under the rear edge of the sliding roof panel which is independent from and horizontally movable relative to the cross member to which the drive means and pivoting linkages are attached.

This novel arrangement makes it possible to maintain the rain channel in place while the cross member moves longitudinally during the upward and downward pivoting motions of the sliding roof panel. Thus, there is no danger of interference between the rain channel and the panel canopy, since the rain channel can be kept narrower and does not move forwardly out of its normal position.

The advantages of this invention can be utilized to the fullest when the cross member is arranged behind the rain channel in relation to the rear edge of the sliding roof panel.

In a preferred embodiment of the invention the cross member is connected to a lateral guide arm on each side of the sliding roof structure, the guide arms reaching forward of the rain channel and each carrying a pivot pin at its forward end to which the pivoting linkages for the sliding roof panel are attached. Thus, while the linkages are in front of the rain channel, the cross member to which the linkages are attached is arranged behind the rain channel.

A simple arrangement for the movement and positioning of the rain channel under the rear edge of the sliding roof panel is obtainable by providing a yielding connecting means between the cross member and the rain channel which is so arranged that the rain channel is engaged for horizontal motion whenever the sliding roof panel moves horizontally, while maintaining the rain channel in position during that portion of the cross member motion which produces the upward and downward pivoting of the sliding roof panel.

A still further simplified preferred embodiment suggests a sliding roof structure in which the rain channel is guided for horizontal motion but not connected to either the cross member or the sliding roof panel. In this case the rain channel is provided with one or several connecting braces which are engageable by the rear edge of the sliding roof panel, when the latter is lowered for retraction, so that the panel itself entrains the rain channel for horizontal motion.

Since the rear edge of the sliding roof panel is preferably provided with a resilient seal, the connecting braces are arranged to engage the seal so as to provide a rattle-free engagement between the panel and the rain channel.

In order to secure the independent rain channel in its normal forward position underneath the rear edge of the sliding roof panel against inadvertent displacement, the rain channel is provided with two positioning blocks which also serve as guide elements in conjunction with the guide rails for the cross member, the positioning blocks including snap elements or similarly operating detent means which engage a stationary part on the roof structure so as to retain the rain channel in its forward position until it is forcibly retracted by the action of the lowered rear edge of the sliding roof panel.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figure 2:
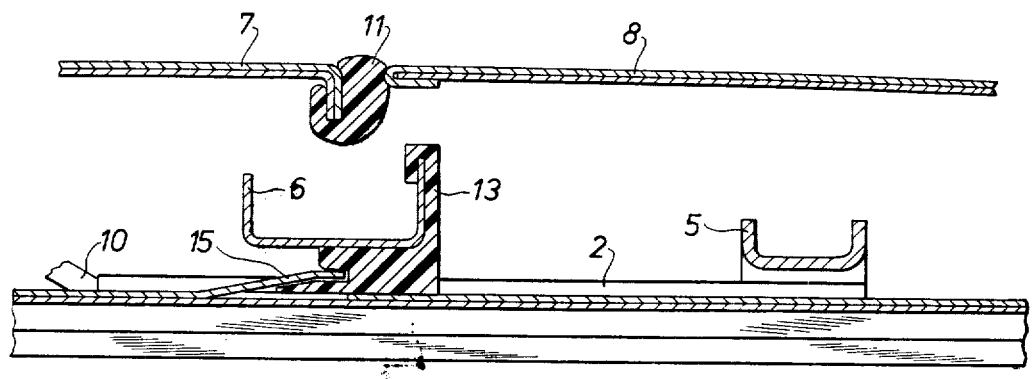
FIG. 2 is an elevational cross section taken along line II — II of FIG. 1.
Figure 1:
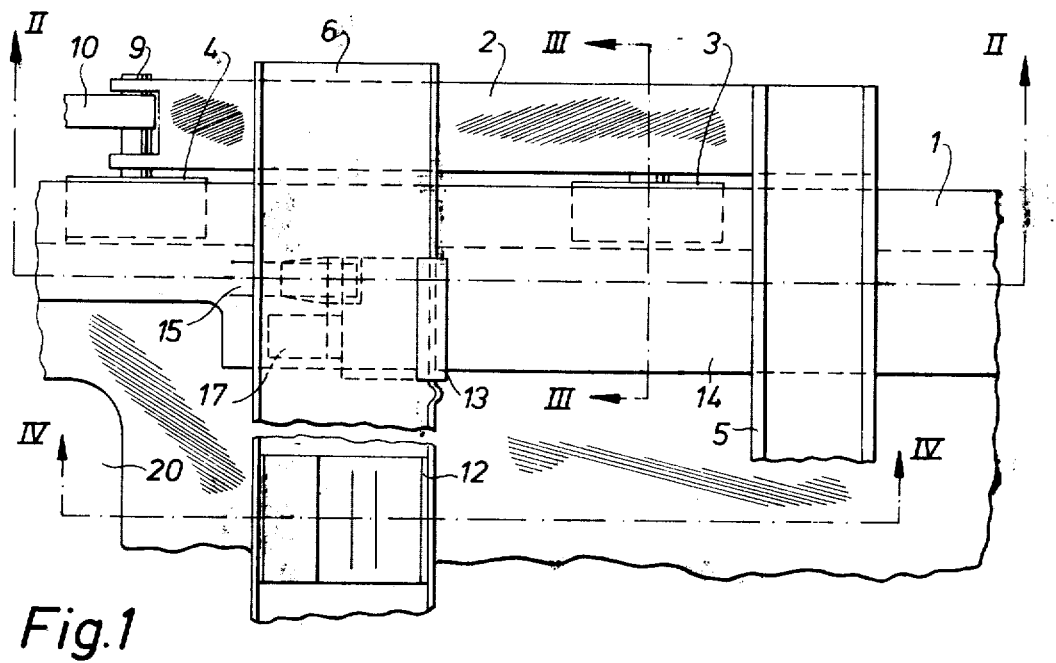
FIG. 1 shows in a plan view the rear right-hand portion of a sliding roof structure embodying the invention.
Figure 3:
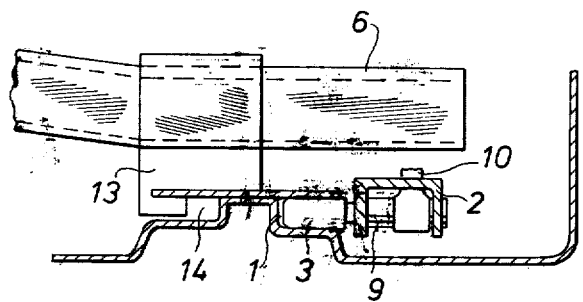
FIG. 3 is a partial transverse cross section taken along line III — III of FIG. 1.

FIGS. 1 to 5 of the drawings illustrate a sliding roof structure for automobiles which includes a known pivoting mechanism, such as is disclosed, for example, in the German Offenlegungsschrift (Published Application) No. 2,016,492. The sliding roof structure includes longitudinal guides in the form of a guide rail 1 on each side of the stationary roof structure, the forward end of the sliding roof panel (not shown) being guided along these guide rails. Also guided on each guide rail is a lateral guide arm 2 which carries two guide lugs 3 and 4, the lateral guide arms 2 being rigidly connected to a cross member 5 which extends across the width of the sliding roof structure. A rain channel 6 also extends transversely between the guide rails 1, but is not connected to either the guide arms 2 or the cross member 5. It should be understood that the elements illustrated in FIG. 1 are essentially duplicated on the left-hand side of the roof structure.

The movable panel 7 of the sliding roof structure, of which only the rear portion is shown in the drawing, is pivotable upwardly or downwardly out of its closed position (FIG. 2), depending upon the opening mode desired. These pivoting motions are imparted to the panel 7 through the motion of the cross member 5 and guide arms 2, via pivoting linkages of which only the lower pivot axis 9 and connecting link 10 are shown in FIG. 1. The cross member 5 in turn is engaged by the drive means of the sliding roof structure which may be a pushpull cable, for example a threaded cable, or some other suitable drive means. Since the guide arms 2 are rigidly connected to the cross member 5, the horizontal motion of the latter provides both the upward and downward pivoting motion of the rear end of panel 7 and the retracting motion of the panel in the retraction opening mode.

Figure 4:
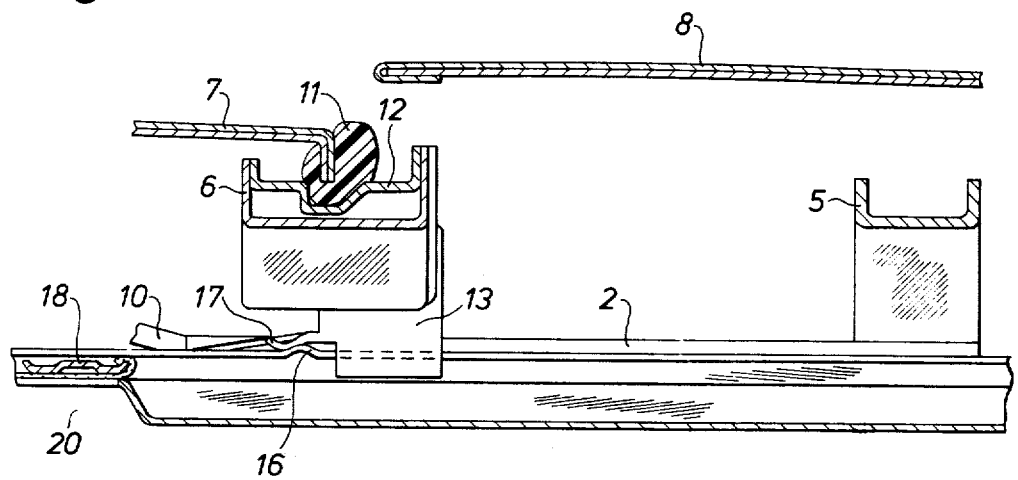
FIG. 4 is an elevational cross section taken along line IV — IV of FIG. 1, with the sliding roof panel in its lowered position.

In the case of the retraction opening mode, the panel 7 is first lowered, as shown in FIG. 4, whereby the cross member 5 is moved a distance away from the rain channel 6. As it is lowered, the rear edge of panel 7 engages connecting braces 12 in the rain channel, the connecting braces being so arranged that the seal 11 which surrounds the edge of the panel 7 firmly engages the brace 12 so as to provide a horizontal connection between the rain channel 6 and the panel 7. As the cross member 5 is further retracted, thereby also retracting the sliding panel 7, the rain channel 6 is likewise retracted under the stationary roof portion 8 in unison with the panel 7 and the cross member 5.

During this retracting motion, the rain channel 6 is guided on the guide rails 1 of the stationary roof structure by means of positioning blocks 13 (FIG. 3) which engage the portions 14 of the guide rails 1. The positioning blocks 13 also serve as retaining means for the rain channel 6 in its normal forward position underneath the rear edge of panel 7. An upstanding stop 15 (FIG. 2) serves as an abutment at the end of the forward motion of the rain channel, and a stationary boss 16, which cooperates with a flexible finger 17 on the positioning block 13, acts as a detent-type retaining means. Only when the rear edge of panel 7 engages the connecting braces 12 of the rain channel, is the latter movable horizontally into and out of its normal forward position in which it is retained by the detent 16, 17.

Figure 5:
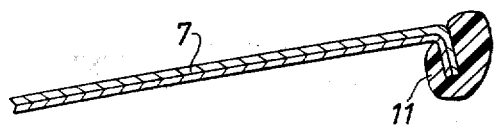
FIG. 5 shows the elevational configuration of FIG. 4, with the sliding roof panel in its upward pivoted position.
Figure 5:
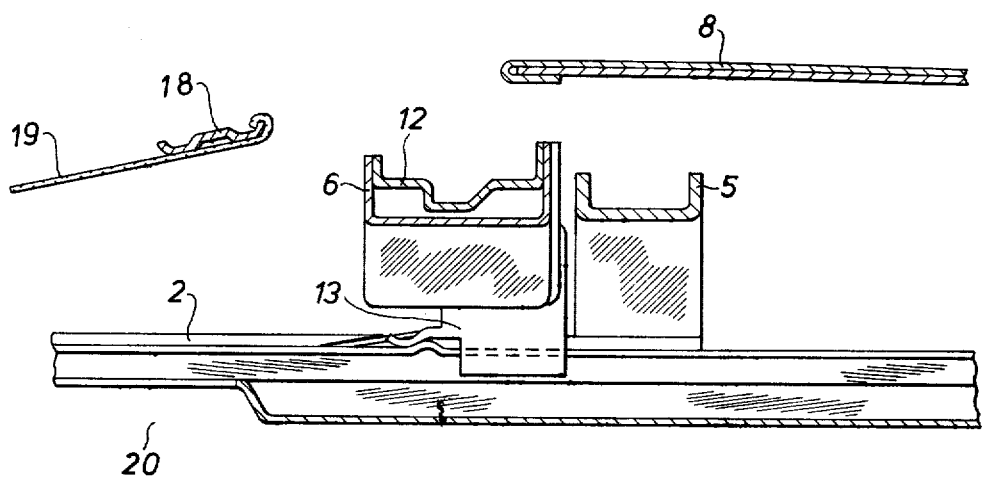

In the upward opening mode of the sliding roof panel, the rear edge of panel 7 is pivoted upwardly out of its closed position (FIG. 2), the pivoting motion being produced by a forward movement of cross member 5, as shown in FIG. 5, via the known pivoting linkages (not shown). The effective roof opening 20 (FIG. 5), which is determined by the position of the rear profile 18 of a frame carrying the canopy 19, can be kept at a maximum length in relation to the opening for the panel 7, because the rain channel 6 does not move forwardly with the cross member, but remains in place under the gap between panel 7 and the stationary roof portion 8. This feature is unlike prior art structures where the cross member also serves as a rain channel and, through its forward motion during the upward pivoting of panel 7, tends to interfere with the frame profile 18, meaning that the canopy 19 would have to be shorter and the inner roof opening 20 would be correspondingly reduced.

The motion of the rain channel can be achieved in an alternative fashion, by providing a yielding connection between the cross member 5 and the rain channel 6. Appropriate connecting elements serve the purpose of allowing the relative motion of the cross member toward and away from the rain channel during the upward and downward pivoting motions of panel 7, but move the rain channel in unison with cross member 5 during the retraction and closing motions of panel 7 in the retraction opening mode.

Figure 6:
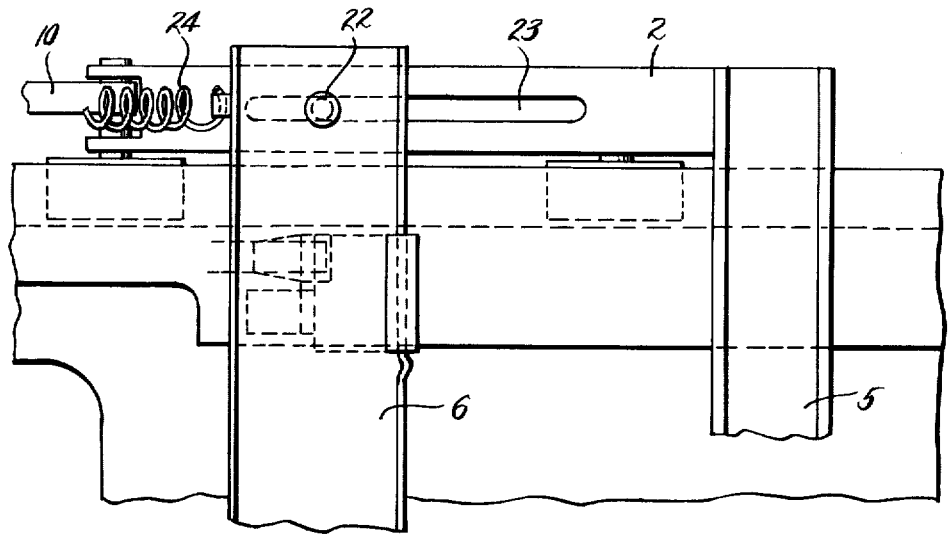
FIG. 6 is a view similar to that of FIG. 1, showing a modified embodiment of the invention.
Figure 7:
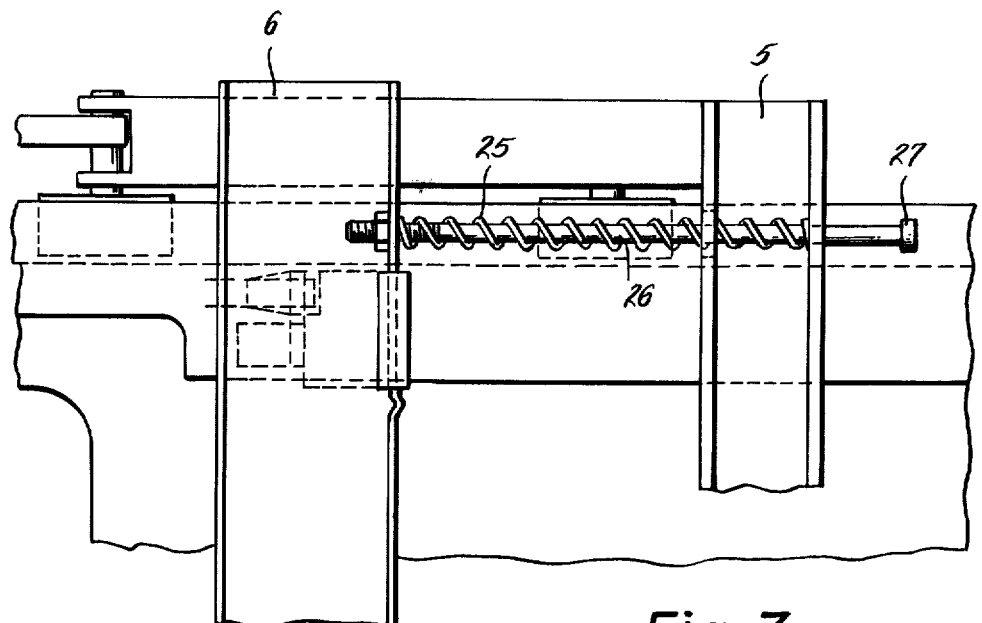
FIG. 7 is similar to FIG. 6, showing still another embodiment modification.

Connecting elements of this kind are shown in FIGS. 6 and 7. FIG. 6, for instance, shows a pin 22 attached to the rain channel 6 which engages a longitudinal slot 23 in the guide arm 2 of the cross member 5. A tension spring 24 extends between the rain channel 6 and the front end of the connecting link 10, or an appropraite point (not shown) at the rear end of the panel 7. The spring 24 thus holds the rain channel 6 in its abutment position, until the cross member 5 is retracted to a position in which the panel 7 is lowered for retraction. At this point the pin 22 engages the forward end of the slot 23 so as to retract the rain channel 6 in unison with the cross member 5. The rearward extension of the slot 23 accomodates the approaching motion between the rain channel 6 and the cross member 5 during the upward pivoting of the roof panel 7.

FIG. 7 shows a set of connecting elements which are analogous in function to those shown in FIG. 6. A compression spring 25 between the rain channel 6 and the cross member 5 urges the former against its forward abutment. A rod 26 carrying the compression spring 25 is attached to the rain channel 6 and extends rearwardly through both vertical walls of the cross member 5. At its rear end the rod 26 has a head 27 which, by bearing against the cross member 5 after retraction of the latter until the panel 7 is lowered, retracts the rain channel 6 over the remainder of the opening displacement. The rod 26 may be threaded into the rear wall of the rain channel 6, or it may slide through a bore therein, having an abutment head at its front end.

It should be understood, of course, that the foregoing disclosure describes only preferred embodiments of the invention and that it is intended to cover all changes and modifications of these examples of the invention which fall within the scope of the appended claims.

We claim:

1. A sliding roof assembly for automobiles, where a generally rectangular movable sliding roof panel is operable in a first opening mode in which its rear end is pivoted upwardly out of a roof opening and in a second opening mode in which its rear end is pivoted downwardly out of the roof opening and the downwardly pivoted sliding roof panel is retracted rearwardly underneath a stationary roof portion, while the front end of the panel and a cross member by which said motions are imparted to the sliding roof panel from a drive means are guided along stationary longitudinal guides, and the pivoting motions of the panel are obtained by pivoting linkages connecting the cross member to the rear portion of the sliding roof panel, and wherein the improvement comprises:

a transversely extending rain channel separate from the roof panel and arranged below the roof level, the rain channel being guided for longitudinal motion between a forward position underneath the rear edge of the roof opening and a retracted position which corresponds to the retraction displacement of the sliding roof panel in said second opening mode, the rain channel being further longitudinally movable relative to said cross member; and means for retracting and advancing the rain channel in unison with the retracting motion of the sliding roof panel in said second opening mode.

2. A sliding roof assembly as defined in claim 1, wherein:

the rain channel is movable along the stationary longitudinal guides for the cross member, the latter being arranged to the rear of the rain channel.

3. A sliding roof assembly as defined in claim 1, wherein the improvements further conclude:

means for abutting the rain channel in the forward direction, when it is in its forward position; and means for releasably retaining the rain channel in its forward position during the upward pivoting motion of the sliding roof panel.

4. A sliding roof assembly as defined in claim 3, wherein:

the rain channel retracting and advancing means includes a means for engaging the rain channel with the rear edge of the sliding roof panel, when the latter is pivoted downwardly in the second opening mode, whereby any subsequent retracting and advancing motions of the lowered sliding roof panel are also imparted to the rain channel.

5. A sliding roof assembly as defined in claim 4, wherein:

the engaging means includes a downwardly oriented ledge on the rear edge of the sliding roof panel and at least one matchingly shaped connecting brace extending across the profile of the rain channel, the ledge of the panel, when lowered into the connecting brace, providing a connection between the panel and the rain channel so that the latter moves with the former.

6. A sliding roof assembly as defined in claim 5, wherein:

the ledge on the rear edge of the sliding roof panel includes a rubber member which also serves as a seal against the stationary roof portion.

7. A sliding roof assembly as defined in claim 3, wherein:

the rain channel is movable in substantially the same plane as the cross member, the latter being arranged to the rear of the former; and the cross member includes at each lateral end a forwardly extending guide arm reaching forward of the rain channel, an end of each pivoting linkage being connected to one of the guide arms at a point forward of the rain channel.

8. A sliding roof assembly as defined in claim 7, wherein:

the rain channel retracting and advancing means includes connecting means between the rain channel and the cross member for the accomodation of an advancing motion of the cross member relative to the forwardly abutted rain channel during the upward opening motion of the sliding roof panel and for the entrainment of the rain channel in unison with the cross member during the panel retracting and advancing motions.

9. A sliding roof assembly as defined in claim 8, wherein:

the connecting means includes a longitudinal slot in each guide arm and a pin attached to each lateral end portion of the rain channel so as to engage the slot; and the rain channel retaining means includes a spring which urges the cross member away from the rain channel.

10. A sliding roof assembly as defined in claim 8, wherein:

the connecting means includes at least one connecting rod and cooperating compression spring between the rain channel and the cross member, the connecting rod having at least one collar limiting the maximum spacing between the rain channel and cross member, while permitting a relative approaching motion against the compression spring.

11. A sliding roof assembly as defined in claim 7, wherein:

the rain channel includes guide means in the form of at least two positioning blocks engaging the stationary longitudinal guides for the cross member; and the rain channel abutting means cooperates with said positioning blocks.

12. A sliding roof assembly as defined in claim 11, wherein:

the rain channel retaining means includes a resilient detent finger as part of each positioning block and a stationary boss for each detent finger cooperating with the latter to retain the rain channel in its forward position until a predetermined retracting force applied to the rain channel overcomes the action of the detent fingers.

* * * * *